US011380214B2

(12) United States Patent
Geiselhart et al.

(10) Patent No.: US 11,380,214 B2
(45) Date of Patent: *Jul. 5, 2022

(54) MEMORY RETENTION ENHANCEMENT FOR ELECTRONIC TEXT

(71) Applicant: International Business Machines Corporation, Armonk, NY (US)

(72) Inventors: Reinhold Geiselhart, Rottenburg (DE); Frank Küster, Steinheim (DE); Vassil Radkov Dimov, Stuttgart (DE); Zalina Baysarova, Boeblingen (DE); Iliyana Ivanova, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 692 days.

This patent is subject to a terminal disclaimer.

(21) Appl. No.: 16/279,458

(22) Filed: Feb. 19, 2019

(65) Prior Publication Data
US 2020/0265739 A1    Aug. 20, 2020

(51) Int. Cl.
*G09B 19/00* (2006.01)
*G09B 5/02* (2006.01)
*H04L 67/12* (2022.01)

(52) U.S. Cl.
CPC ............. *G09B 19/00* (2013.01); *G09B 5/02* (2013.01); *H04L 67/12* (2013.01)

(58) Field of Classification Search
CPC .................................. G09B 19/00; G09B 5/02
See application file for complete search history.

(56) References Cited

U.S. PATENT DOCUMENTS

| 8,209,601 | B2 | 6/2012 | Bever et al. |
| 8,799,755 | B2 | 8/2014 | Krause |
| 2009/0142737 | A1* | 6/2009 | Breig ................. G09B 17/003 434/167 |
| 2009/0264800 | A1* | 10/2009 | Gestetner ................ A61H 5/00 351/203 |
| 2010/0153889 | A1 | 6/2010 | Krause |
| 2010/0257444 | A1 | 10/2010 | Bever et al. |
| 2015/0213634 | A1* | 7/2015 | Karmarkar ............ G06V 40/18 345/589 |
| 2015/0241962 | A1* | 8/2015 | Reznik .................. G06F 3/0346 345/156 |
| 2015/0241984 | A1* | 8/2015 | Itzhaik .................. G06F 3/0346 345/173 |

(Continued)

OTHER PUBLICATIONS

Mell et al., "The NIST Definition of Cloud Computing", Recommendations of the National Institute of Standards and Technology, Sep. 2011, 7 pages.

(Continued)

*Primary Examiner* — David E Choi
(74) *Attorney, Agent, or Firm* — James L. Olsen

(57) ABSTRACT

Aspects of the present disclosure relate to enhancing reading retention of users reading electronic text. A set of user data associated with a user currently reading electronic text on a device is received, the set of user data indicative of a reading retention of the user. The set of user data is analyzed to determine whether a retention enhancement action should be issued. In response to a determination that a retention action should be issued, the retention enhancement action is issued at the device the user is currently reading electronic text on.

10 Claims, 6 Drawing Sheets

(56) References Cited

U.S. PATENT DOCUMENTS

| | | | |
|---|---|---|---|
| 2016/0203002 A1* | 7/2016 | Kannan | G10L 15/1822 |
| | | | 715/708 |
| 2017/0046311 A1 | 2/2017 | Walker | |
| 2017/0200296 A1 | 7/2017 | Jones et al. | |
| 2017/0287335 A1* | 10/2017 | Ansari | B60W 40/04 |
| 2018/0005539 A1* | 1/2018 | Chatow | G09B 5/00 |
| 2019/0072397 A1* | 3/2019 | Williams | G01C 21/3676 |
| 2020/0143773 A1* | 5/2020 | Tholfsen | G09G 5/22 |
| 2020/0265740 A1* | 8/2020 | Geiselhart | G09B 17/003 |

OTHER PUBLICATIONS

Geiselhart et al., "Memory Retention Enhancement for Electronic Text", U.S. Appl. No. 16/458,278, filed Jul. 1, 2019.
IBM, List of IBM Patents or Patent Applications Treated as Related, Jun. 24, 2019, 2 pages.

* cited by examiner

MEMORY RETENTION ENHANCEMENT FOR ELECTRONIC TEXT

BACKGROUND

The present disclosure relates generally to the field of electronic text, and in particular to enhancing memory retention of users reading electronic text.

A wealth of information is available for reading online. This includes, among other types of content, electronic encyclopedias, news, e-books, digitized print, and social media posts. As electronic text sources (e.g., digital libraries, electronically accessible news, social media, etc.) become more popular, as too does reading information electronically.

SUMMARY

Embodiments of the present disclosure include a method, computer program product, and system for enhancing reading retention of users reading electronic text. A set of user data associated with a user currently reading electronic text on a device can be received, the set of user data indicative of a reading retention of the user. The set of user data can be analyzed to determine whether a retention action should be issued. In response to a determination that a retention action should be issued, the retention action can be issued at the device the user is currently reading electronic text on.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
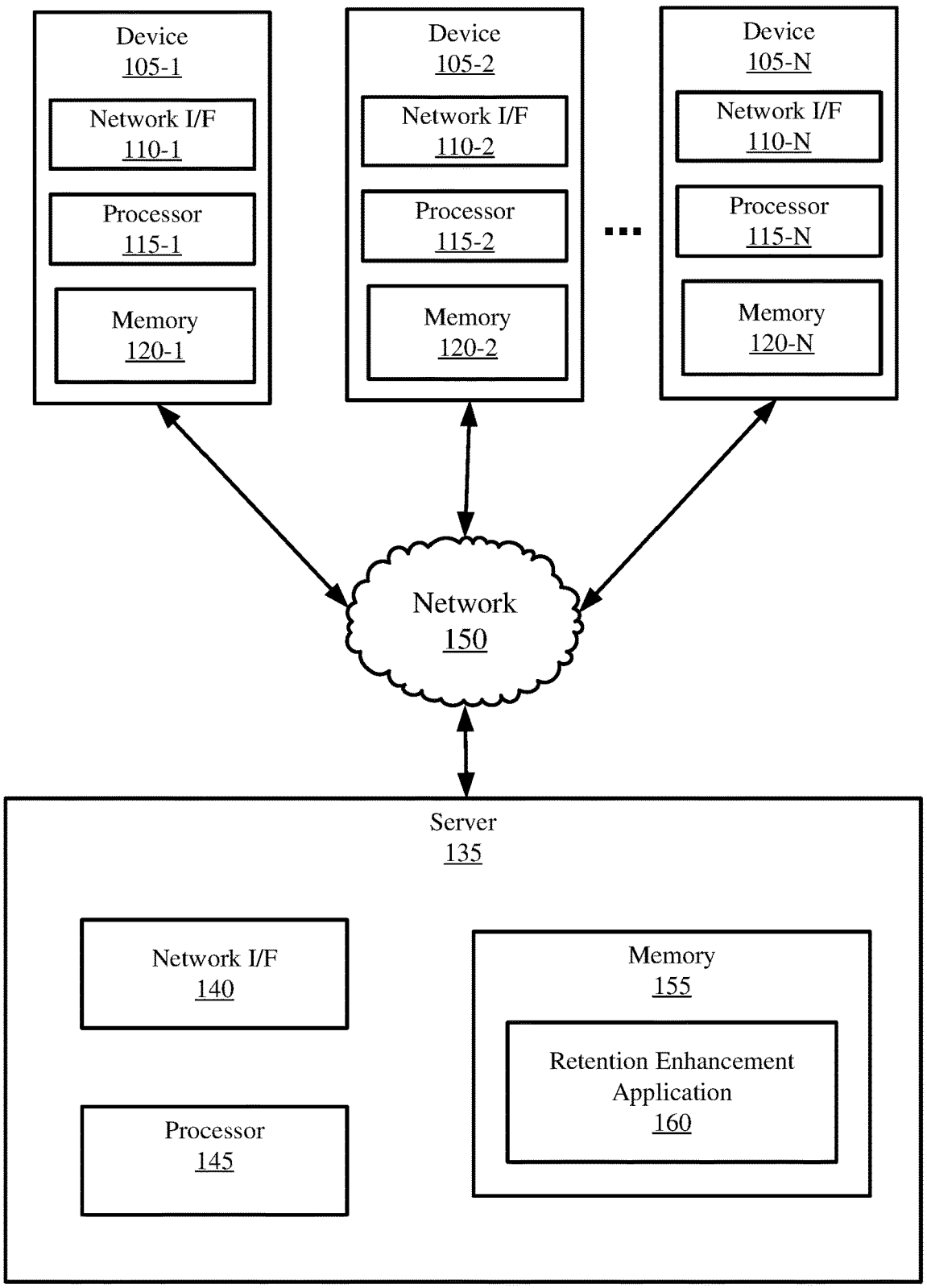
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of electronic text, and in particular to enhancing retention for users reading electronic text. While the present disclosure is not necessarily limited to such applications, various aspects of the disclosure can be appreciated through a discussion of various examples using this context.

A wealth of information is available for reading online. This includes, among other types of content, electronic encyclopedias, news, e-books, digitized print, and social media posts. As electronic text sources (e.g., digital libraries, electronically accessible news, social media, etc.) become more popular, as too does reading information electronically.

When reading electronic text, users often lose focus and concentration over time. Consequently, users may not retain all of the information they read. This can be amplified for users with conditions already affecting their reading abilities (e.g., attention-deficit/hyperactivity disorder, dyslexia, etc.). Currently, there is no known solution for identifying a degraded retention level of a user and issuing a retention action to enhance the user's reading retention.

Aspects of the present disclosure are directed to enhancing reading retention for users reading electronic text. A set of user data can be received for a user currently reading electronic text on a device. The set of user data can include, among other sources, eye-tracking data, electronic device interaction data, biometric data, and facial recognition data. The set of user data can be analyzed to determine whether a degraded retention level is observed. In response to determining that a degraded retention level is observed, a retention enhancement action can be issued. The retention enhancement action can include, among other actions, altering text characteristics (e.g., font, color, size, boldness, underlining, etc.), altering text zoom level, and letter scrambling.

Turning now to the Figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, eye-tracking device, wearable device, or other input device), and/or any commercially available or custom software (e.g., browser software, communications software, server software, natural language processing software, search engine and/or web crawling software, image processing software, eye-tracking software, facial expression recognition software, biometric reading software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a retention enhancement application 160. The retention enhancement application 160 can be configured to enhance the retention (e.g., focus, ability to ingest information, alertness, etc.) of a user reading electronic text. To do so, the retention enhancement application 160 can be configured to collect user data (e.g., data regarding the user's interaction with their electronic display, eye-tracking data, facial expression data, biometric data, etc.), analyze the user data to determine whether a retention action should be issued (e.g., by comparing a retention level of the user to a retention threshold), and execute, in response to a determination that a retention action should be issued, the retention action. In embodiments, the retention action can include modifying the electronic text (e.g., the size, font, color, boldness, word scrambling, etc.) displayed on the user's device (e.g., device 105-1).

Though this disclosure pertains to the collection of personal data, it is noted that in embodiments, users opt-in to the system. In doing so, they are informed of what data is collected and how it will be used, that any collected personal data may be encrypted while being used, that the users can opt-out at any time, and that if they opt-out, any personal data of the user is deleted.

In embodiments, data associated with the retention enhancement application 160 can be transmitted to the devices 105 on a push or pull basis. Further, in embodiments, the retention enhancement application 160 can be installed directly on the devices 105, or alternatively, provisioned to the devices 105 over the network 150 such that installation is not necessary.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
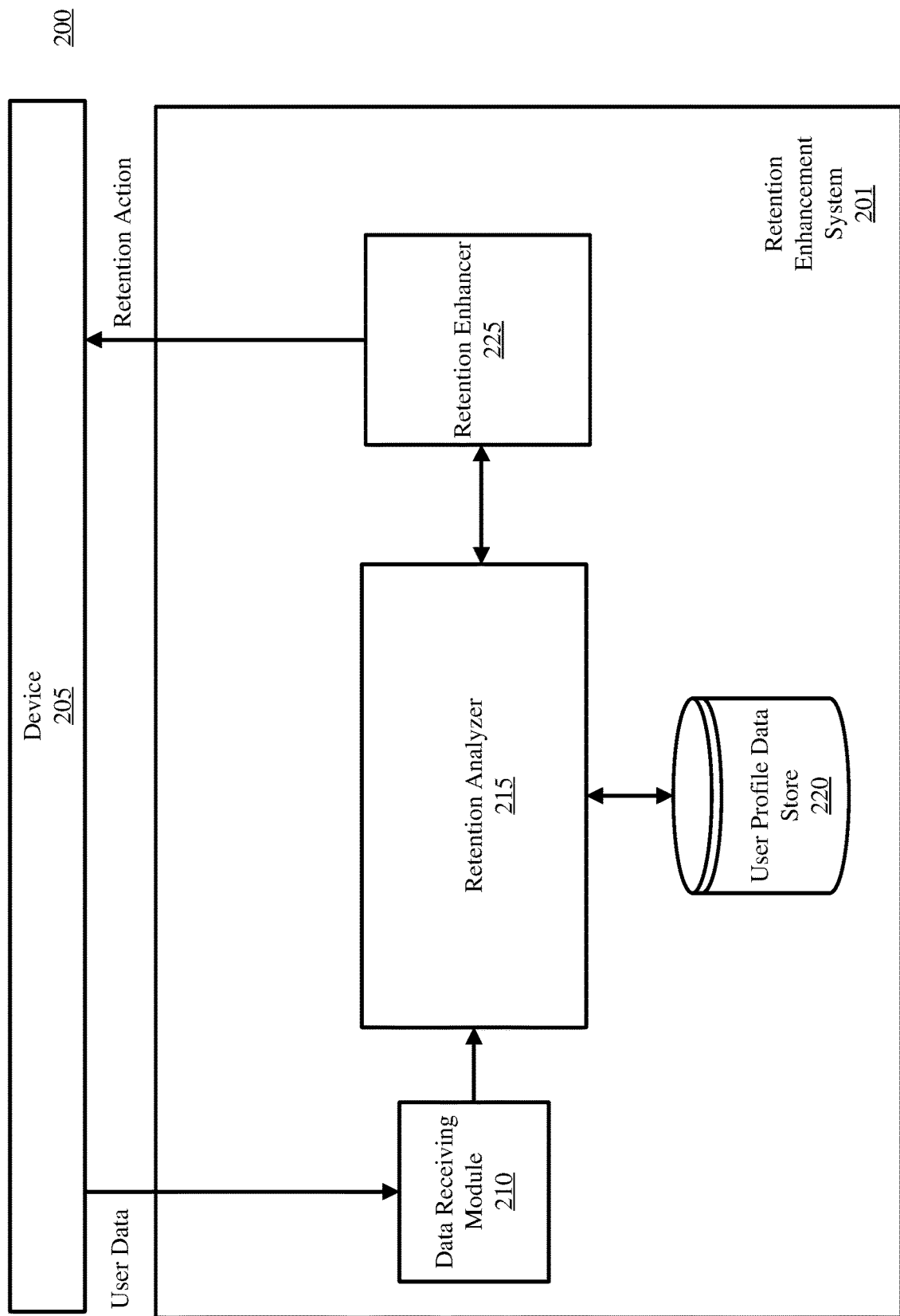
FIG. 2 is a block diagram illustrating a retention enhancement system, in accordance with embodiments of the present disclosure.

FIG. 2 is a block diagram illustrating an example computing environment 200 in which illustrative embodiments of the present disclosure can be implemented. The computing environment 200 includes a device 205 and a retention enhancement system 201. The retention enhancement system (e.g., which may be the same as, or substantially similar to, retention enhancement application 160 of FIG. 1) includes a data receiving module 210, a retention analyzer 215, a user profile data store 220, and a retention enhancer 225. In embodiments, the data receiving module 210, retention analyzer 215, user profile data store 220, and retention enhancer 225 can include processor executable instructions that can be executed by a dedicated or shared processor using received inputs (e.g., from device 205).

Consistent with various embodiments, the data receiving module 210 can be configured to receive data from the device 205 (e.g., devices 105 of FIG. 1). Data received by the data receiving module 210 can include, but is not limited to, images, electronic documents, device interaction data (e.g., mouse movements, scrolling, highlighting, etc.), display data, biometric data, website data, audio data, and/or video data. In some embodiments, the data receiving module 210 can be configured to reformat, tag, or otherwise process the data.

The data receiving module 210 then dispatches the data to the retention analyzer 215. The retention analyzer 215 can be configured to determine whether a retention action should be issued by the retention enhancer 225. This can be completed in a variety of manners. For example, the retention analyzer 215 can be configured to determine whether a retention action should be issued by the retention enhancer 225 based on eye-tracking data (e.g., indicative of reading activity and/or speed), mood detection (e.g., facial expression approximation), electronic device interactions (e.g., mouse movements, scrolling speed, viewport changes, etc.), and biometric data.

In some embodiments, the retention analyzer 215 can determine whether a retention action should be issued based on a reading speed of a user. For example, if a user's current reading speed falls a predetermined amount (e.g., percentage, value, etc.) below their average reading speed, a determination can be made that a retention action should be issued. Following the above example, assume a retention threshold is set such that if a user falls below 50% of their average reading speed, the retention analyzer 215 determines that a retention action should be issued. In this example, if a user's average reading speed is 200 words/min and their current reading speed is 70 words/min, a determination can be made to issue a retention action (e.g., because the user's current reading speed is less than 50% of their average speed). This can be completed using any suitable threshold. For example, in some embodiments, the retention analyzer 215 can be configured to determine that a retention action should be issued based on an observed reading speed falling below a fixed value (e.g., 50 words/min).

Reading speed can be determined in any suitable manner. In some embodiments, reading speed can be determined with the aid of eye-tracking technology (e.g., collected from an additional device such as a head mounted display (HMD) or camera over a network). In these embodiments, the number of words read over time, as measured by the eye-tracking system, can indicate a user's reading speed. In some embodiments, reading speed can be determined based on word throughput through a given viewport (e.g., a display), application (e.g., a word document, pdf, e-book application, etc.), or website. That is, the reading speed can be determined based on the number of words traversed (e.g., displaced on a user's screen) over a given time interval. As an example, if a user traverses 500 words (e.g., 500 words are displaced across the screen) in 2 minutes, a determination can be made that the user's reading speed is 250 words/min. As another example, if a user reads 2 pages in 3 minutes, and each page has 600 words, then a determination can be made that the user's reading speed is 400 words/min. Reading speed measurements can be stored in the user profile data store 220 for each user. The totality of reading speed measurements for each user can be used to calculate an average reading speed for each user.

In some embodiments, the retention analyzer 215 can determine a user's reading retention based on a mood of the user. For example, the retention analyzer 215 may be configured to perform facial expression interpretation (e.g., using supervised or unsupervised machine learning) to determine a mood of the user. This can aid in determining whether the user is tired, drowsy, fatigued, sad, frustrated, or any other mood indicative of a degraded retention state. In these embodiments, if the retention analyzer 215 outputs a mood indicative of a degraded retention level, then a determination can be made to issue a memory retention action by the retention enhancer 225.

In embodiments, the retention analyzer 215 can analyze biometric data (e.g., heart rate, blood glucose level, caffeine intake, respiratory rate, etc.) to determine if retention actions should be issued by the retention enhancer 225. For example, the retention analyzer 215 can obtain a heart rate of a user via a wearable device (e.g., a smart watch). The heart rate of the user can then be compared to the user's average heart rate to aid in determining whether a retention action should be issued. As an example, if a user's current heart rate drops a predetermined level (e.g., 10 bpm, 20%, etc.) below their average heart rate, the retention analyzer 215 can be configured to determine that a retention action should be issued by the retention enhancer 225. In embodiments, the user's biometric data can be securely stored in the user profile data store 220. The history of biometric data stored in the user profile data store 220 can be used to better predict retention degradation states in the future. Ultimately, the user profile data store 220 can be used to select optimal retention actions per user (e.g., based on each user's historical data).

In some embodiments, the retention analyzer 215 can be configured to determine whether a retention action should be issued by analyzing a user's interactions with an electronic device they are reading on. For example, the retention analyzer 215 can be configured to analyze the user's input activity (e.g., highlighting of text portions with the mouse, moving the mouse along portions of the text while reading, scrolling along text with keyboard arrows, scrolling along text with a touch pad, etc.), reading speed (e.g., based on a throughput of words through a viewport, application, website, etc. of the device), and/or navigation data (e.g., scrolling speed, which paragraphs and/or lines of text are visible over time, the number of paragraphs and/or lines of text visited over time (compared to an average value for each user), the "jump distance" to and from a particular paragraph, etc.) to determine a retention level of the user.

For example, if a user is highlighting and/or following lines of text with an input device (e.g. a keyboard, touch screen, mouse, etc.), unless a copy/paste action is observed, a determination can be made that the user is highlighting and/or following text as a reading aid. This can be used to determine whether a retention action should be issued. For example, based on the speed at which the highlighting or the line-following occurs, a retention action may or may not be issued. Similarly, if a user remains on the same viewport, page, set of paragraphs, and/or set of sentences of a body of electronic text beyond a predetermined time, a determination can be made to issue a retention action by the retention analyzer 215.

In embodiments, multiple inputs (e.g., biometric data, device interactions, mood detection, eye-tracking data, etc.) can be collectively considered by the retention analyzer 215. Because input activity (e.g., mouse movements), reading speed, navigation data, mood data, biometric readings (e.g., heart rate, blood glucose level, caffeine intake, etc.), and/or eye-tracking data may not all be available (e.g., if a user is not moving their mouse while reading, if there is no biometric data available, if there is no eye-tracking data available, etc.), a generic formula can be used to calculate the retention level. For example, the retention level can be calculated according to Equation (1) depicted below:

$$RDC = \frac{1}{\sum_{i=1}^{n} W_i} * \sum_{i=1}^{n} C_i * W_i \qquad \text{Equation (1)}$$

In Equation (1), RDC (Retention Degradation Confidence) is the confidence value for a low retention level, $C_i$ is a measured criterion which contributes to the memory retention level (e.g., mouse activity, reading speed, navigation data, biometric readings, mood level, etc.), and $W_i$ is a weight applied to each criterion which affects the impact each criterion has on the calculated retention degradation confidence. Using Equation (1), the RDC output can be in the range of 0-1, with 1 indicating a high confidence of a low retention level and 0 indicating a low confidence of a low retention level. Following Equation (1), if the following inputs are obtained: $C_1$ reading speed 0.7, $W_1$ 0.6, $C_2$ mouse movements 1, $W_2$ 0.2, and $C_3$ heart rate 0.5, $W_3$ 0.2, then RDC would be calculated as:

$$RDC = \frac{1}{0.6 + 0.2 + 0.2} * (0.7 * 0.6 + 1 * 0.2 + 0.5 * 0.2) = 0.72$$

The retention analyzer 215 can then be configured to compare the retention degradation confidence to a retention degradation confidence threshold to determine whether a retention action should be issued. In this example, if the retention degradation confidence threshold is 0.80, then a determination can be made that the retention degradation confidence satisfies (e.g., is below) the retention degradation confidence threshold (as 0.72<0.80), and thus triggers no action (e.g., or deactivate a retention action if it was active). On the contrary, any confidence level calculated as 0.80 or higher would trigger a retention enhancement action by retention enhancer 225. This is because higher retention levels output by Equation (1) indicate a higher confidence of a retention degradation (e.g., a low retention level).

Reference will now be made to examples of measuring $C_i$ values of various criteria which can impact the retention level of the user.

A reading speed criterion $C_i$ value can, in some embodiments, be calculated based on a comparison between a user's current reading speed and their average reading speed. For example, assume that User A has a current reading speed of 100 words/min and an average reading speed of 180 words per minute (e.g., he is reading at 55.5% of his average speed). In this example, if a reading threshold is 50% (e.g., User A is required to read at least at 50% of his average reading speed before a degraded retention level is determined), then the $C_i$ value can be output as 0, as User A exceeds the reading threshold (e.g., 0 indicates a low confidence of a low retention level). The weight of the reading speed criterion $W_i$ can be selected in any suitable manner. In embodiments, the weight of the reading speed criterion is relatively high compared to other criteria, as it is a strong indication in whether a user is actively reading/retaining information.

In some embodiments, the $C_i$ value for reading speed may not be binary, but proportional to the distance between the user's current reading speed and average reading speed. For example, assume that if a user attains their average reading speed, $C_i$=0.5. Further assume, that if a user attains at least twice their average reading speed, $C_i$=0 (e.g., indicative of a low confidence of a degraded retention). In this example, if a user reads at half of their average reading speed, $C_i$ can be calculated as 0.75 (e.g., indicative of a high confidence of a degraded retention). Similarly, if the user reads at 0 words/min, the $C_i$ value can be calculated as 1 (e.g., indicative of a max confidence of a degraded retention for the reading criterion). In these embodiments, as lower reading speeds are observed, the confidence of a degraded retention level increases.

$C_i$ values for input activity can be determined in various manners. In some embodiments, if a user is scrolling and/or following along with text with an input device (e.g., including mice, keyboards, or touch screens), a determination can be made input activity is to be included as an extra criterion $C_i$. This is because if a user is following along with text, this is an indication that the user is using the input device as a reading aid. However, if no input activity data is available, other criteria (e.g., reading speed, mood, etc.) can be considered without considering the input activity criterion. In embodiments, the weight value $W_i$ for input activity is relatively low, as input activity only provides a rough indication of retention level.

In embodiments, a $C_i$ value for navigation data can be calculated based on how often a user navigates to a particular location (e.g., page, paragraph, and/or set of sentences) within an electronic document. In these embodiments, navigations to particular locations may only be considered if the user stops on the location for a predetermined amount of time (e.g., 10 seconds). If a user navigates to the same location beyond a predetermined threshold number of instances, a determination can be made that the retention level is degraded, and a high $C_i$ value can be output. For example, assume a threshold number of instances to return to a particular location (e.g., if a user rereads the same paragraph or page "x" number of times, a degraded retention is determined) is four. Following this example, if a user returns to "page 10" of an electronic document five times, a determination can be made that $C_i$ is 1. This increases the confidence of a retention level degradation.

In embodiments, $C_i$ values for mood detection can be calculated based on whether a mood output indicates a user is in a state indicative of a degraded retention level. For example, if a mood estimation (e.g., based on an image analysis using a supervised machine learning model) indicates that a user is tired, then the $C_i$ value can be output as 1, increasing the confidence of a low retention level. Conversely, if the mood estimate indicates that a user is excited, happy, interested, intrigued, or any other mood indicative of a high retention level, then a low $C_i$ value can be output, decreasing the confidence of a low retention level.

In embodiments, $C_i$ values for biometric readings can be calculated based on a comparison between a user's average biometric readings and their current biometric readings. For example, assume a user's average respiratory rate is 15 breaths/min. Further, assume that if the user's respiratory rate falls 33% (e.g., indicative of a drowsy state), a $C_i$ value of 1 will be returned. In this example, if a wearable determines that a user is currently breathing at a rate of 10 breaths/min, a $C_i$ value of 1 can be returned. If the user is currently breathing above 10 breaths/min, a $C_i$ value of 0 can be returned. This example illustrates a binary output, however, in embodiments, the granularity of the $C_i$ value can vary. For example, the $C_i$ value can be a value proportional to the distance between a user's average biometric reading and current biometric reading.

After the retention level RDC is calculated based on the available input data, the RDC is compared to a retention level threshold. If the retention level satisfies (e.g., falls within, does not exceed, etc.) the retention level threshold, then a determination can be made that a retention action is not required. Conversely, if the retention level exceeds the retention level threshold (e.g., RDC=0.75 while the retention level threshold=0.70), then a determination can be made that a retention action is to be issued by the retention enhancer 225.

After the retention analyzer 215 determines whether or not a retention action is to be issued, the retention analyzer 215 dispatches the resulting command to the retention enhancer 225. The retention enhancer 225 can then be configured to issue a retention action at the device 205 (e.g., the device the user is reading on). Retention actions can include, but are not limited to, font adjustments (e.g., font style, bolding, italics, underlining, color, size, etc.), zoom level adjustments (e.g., increasing the size of words displayed on the viewport), screen brightness adjustments, and/or other actions.

For example, in some embodiments, the retention action can include closing one or more other applications (e.g., a video streaming application, a music application, etc.) in the background which may be causing a distraction. In some embodiments, the retention action can include altering the font of the electronic text to Sans Forgetica, a font developed by researchers at RMIT UNIVERSITY. This font, engineered using the principles of cognitive psychology, is designed to enhance reading retention (e.g., based on the angle of the front, letter structure, etc.). In some embodiments, the retention action can include scrambling letters within words of the electronic text. For example, all letters except the first and last letter of each word may be scrambled such that user is required to exert more effort to read the text, which may increase reading retention.

In embodiments, after the retention action is issued by the retention enhancer 225, user data can continue to be collected and analyzed thereafter. This is completed to determine whether the user's retention level has increased such that reversing the retention action is justified. For example, assume that a retention action (e.g., a font change to Sans Forgetica) is issued at a user's electronic device due to the user's reading speeding falling a predetermined amount below their average reading speed. In this example, if the user's reading speed increases above the predetermined amount below their average reading speed, the retention action can be reverted at the user's electronic device.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. For example, though a single device 205 is depicted in FIG. 2, more or fewer devices can be present. In some embodiments, a single device can collect user data, analyze the user data to determine whether a retention actions should be issued, and execute a retention action. In some embodiments, additional devices (e.g., eye-tracking sensors, biometric reading sensors, etc.) can collect user data and transmit the user data to the retention enhancement system 201. In some embodiments, multiple devices or shared resources (e.g., a cloud computing environment) can collectively complete one or more of the functional aspects of the computing (e.g., to increase the precision of the analysis).

Figure 3:
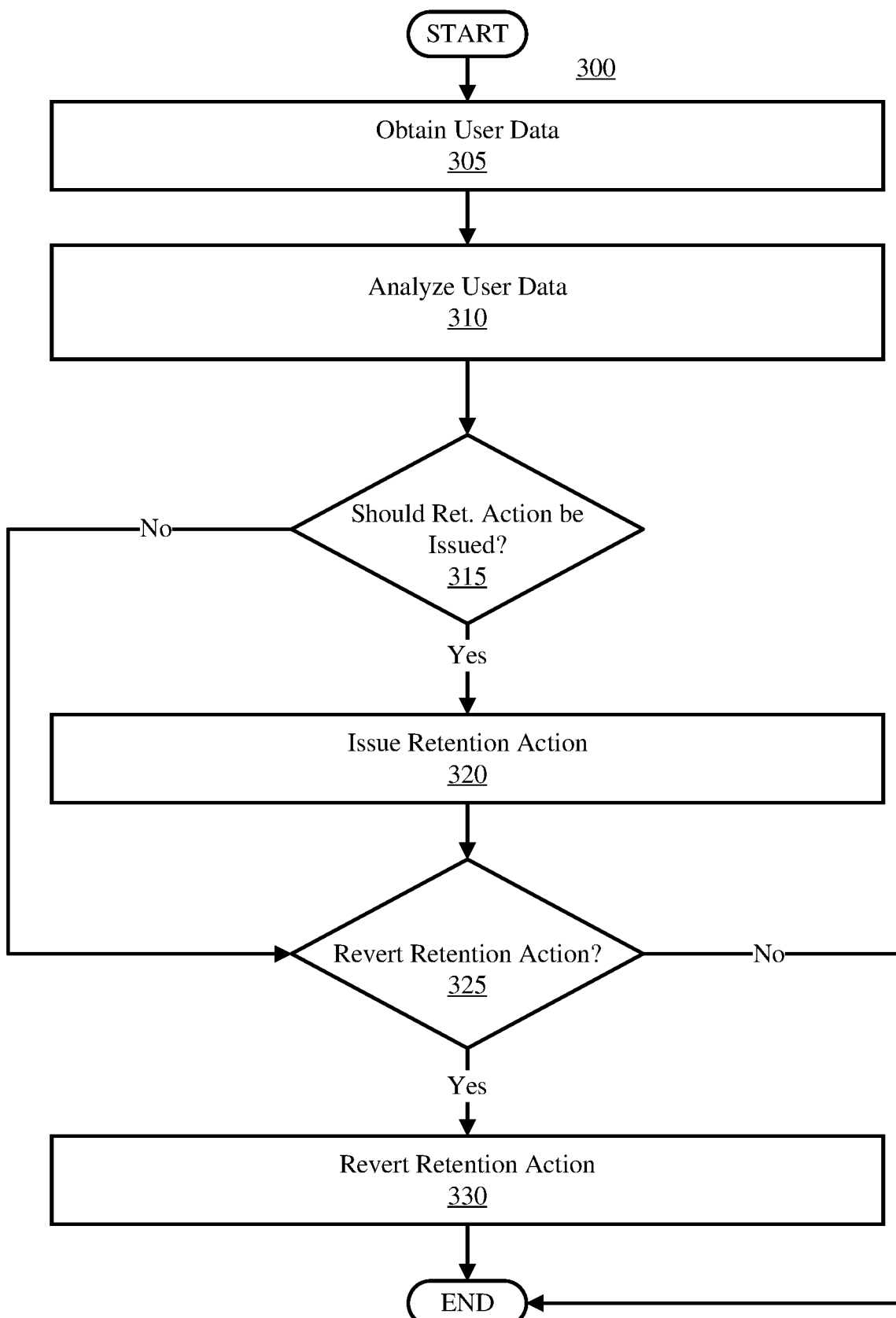
FIG. 3 is a flow-diagram illustrating an example method for enhancing retention of a user reading electronic text, in accordance with embodiments of the present disclosure.

FIG. 3 is a flow-diagram illustrating an example method 300 for enhancing the retention of a user reading electronic text, in accordance with embodiments of the present disclosure.

Method 300 initiates at operation 305, where user data is obtained. User data can include various sources of data which can be used to determine a retention level of a user. For example, user data can include electronic device interaction data, biometric data, eye-tracking data, and facial recognition data. In embodiments, user data can be obtained over a network (e.g., from one or more additional devices or sensors). The user data can be obtained on a pull or push basis.

The user data is then analyzed. This is illustrated at operation 310. In embodiments, the analysis can be completed using the same, or substantially similar, techniques described with respect to the retention analyzer 215 of FIG. 2. For example, reading speed, input interactions, navigation data, biometric data, and/or facial expression data can be compared to an average value or state for the user. In some embodiments, the user data can be compared to a fixed threshold. In some embodiments, multiple inputs can be collectively considered. In these examples, a retention level can be calculated using a generic/normalized formula (e.g., see Equation (1)).

A determination is then made whether a retention action should be issued. This is illustrated at operation 315. The determination whether a retention action should be issued can be completed using the same, or substantially similar, techniques described with respect to the retention analyzer 215 of FIG. 2. For example, the determination can be made based on comparison between current and historical data of a particular user (e.g., average user data), as well as the data of other users. In some embodiments, the determination can be made based on a threshold comparison. For example, if a retention level of a user satisfies a retention level threshold, a determination can be made that a retention enhancement action should be issued.

If a determination is made that a retention action should not be issued, then method 300 proceeds to operation 325, where a determination is made whether a retention action should be reverted (e.g., if another retention action is active).

If a determination is made that a retention action should be issued, then the retention action is issued. This is illustrated at operation 320. Issuing the retention action at operation 320 can be completed using the same, or substantially similar, techniques as described with respect to the retention enhancer 225 of FIG. 2. For example, retention actions can include, but are not limited to, electronic text characteristic adjustment, screen brightness adjustments, word scrambling, and zoom level adjustment.

After the retention action is issued, a determination is made whether the retention action should be reverted. This is illustrated at operation 325. Determining whether the retention action should be reverted can be based on continually collected user data. If the user data indicates that the reading retention of the user has increased to an amount (e.g., above a threshold) such that reverting the retention action is justified, the retention action can be reverted. For example, assume a screen brightness adjustment is issued due to a user's biometric reading falling below a biometric reading threshold. In this example, if the biometric reading later satisfies the biometric reading threshold, the screen brightness adjustment can be reverted to the previous screen brightness.

If a determination is made that the retention action should not be reverted, then method 300 terminates. In embodiments, after a determination is made that the retention action should be not be reverted, user data can continue to be collected (e.g., to determine whether to issue and/or revert one or more retention actions based on the user's reading retention).

If a determination is made that the retention action should be reverted, then the retention action is reverted. This is illustrated at operation 330. For example, if a retention action includes altering electronic text font from Times New Roman to Sans Forgetica, then the font can be reverted back to Times New Roman. As another example, if the retention action includes letter scrambling within words of the electronic text, then the letters of the words can be de-scrambled. Similarly, if the retention action includes closing one or more background applications which may be causing a distraction, then the one or more background applications which were closed can be relaunched.

In some embodiments, a history of previous retention actions can be referenced to determine which retention actions should be issued for particular users in the future. For example, if a text adjustment (e.g., changing a font to Sans Forgetica) increases a user's retention level within a first time period (e.g., 10 seconds) and a screen brightness adjustment increases a user's retention level within a second time period (e.g., 1 minute), then a determination can be made that the text adjustment is an effective retention action for the user. In this example, text adjustment may be selected as the retention action in the future if a degraded retention level is observed.

The aforementioned operations can be completed in any order and are not limited to those described. Additionally, some, all, or none of the aforementioned operations can be completed, while still remaining within the spirit and scope of the present disclosure. For example, in some embodiments, operations 325 and 330 may not be completed, as the retention action may not be reverted.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 4:
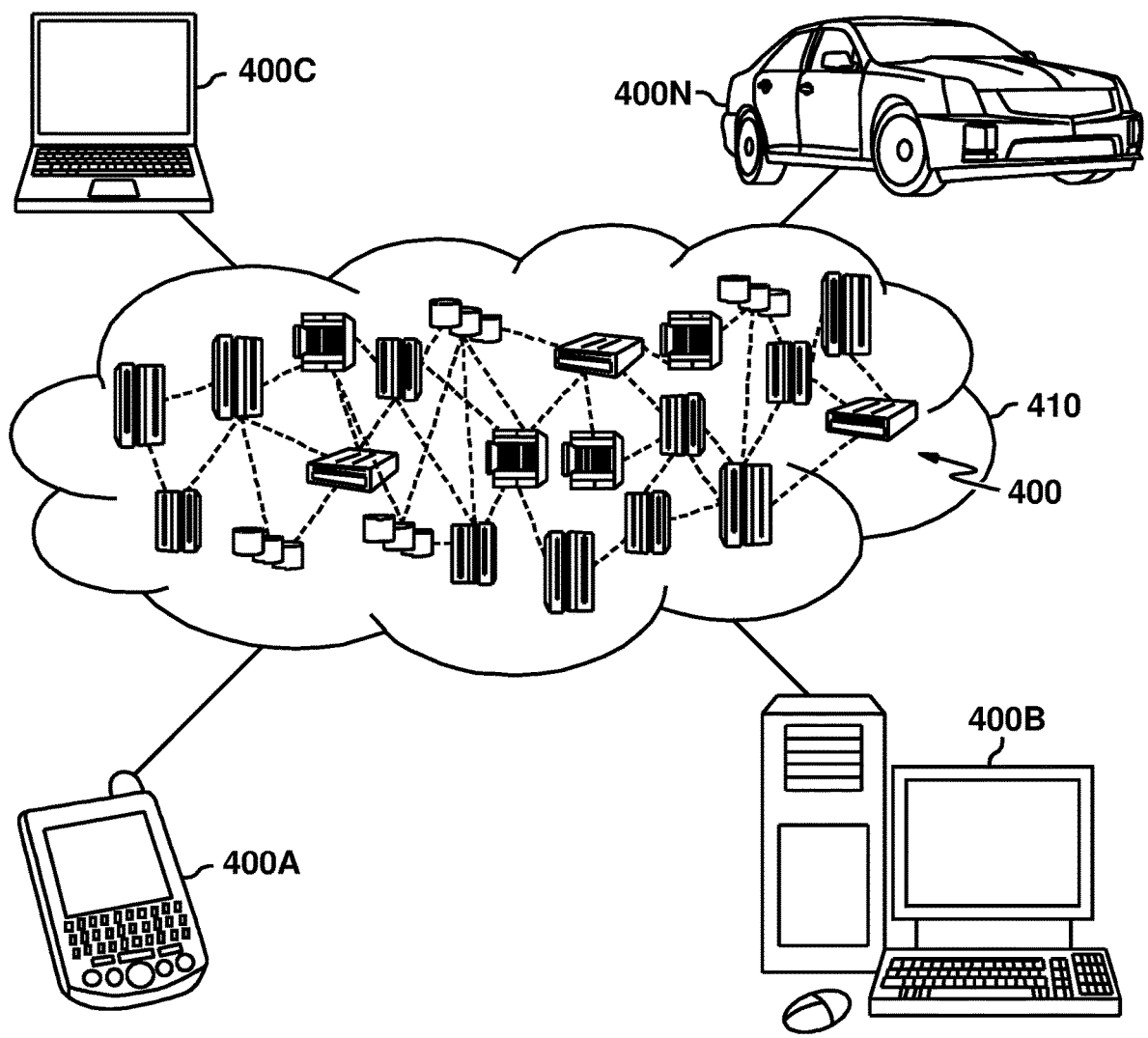
FIG. 4 is a diagram illustrating a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B (e.g., devices 105, server 135, device 205, retention enhancement system 201) laptop computer 400C (e.g., devices 105, server 135, device 205, retention enhancement system 201), and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
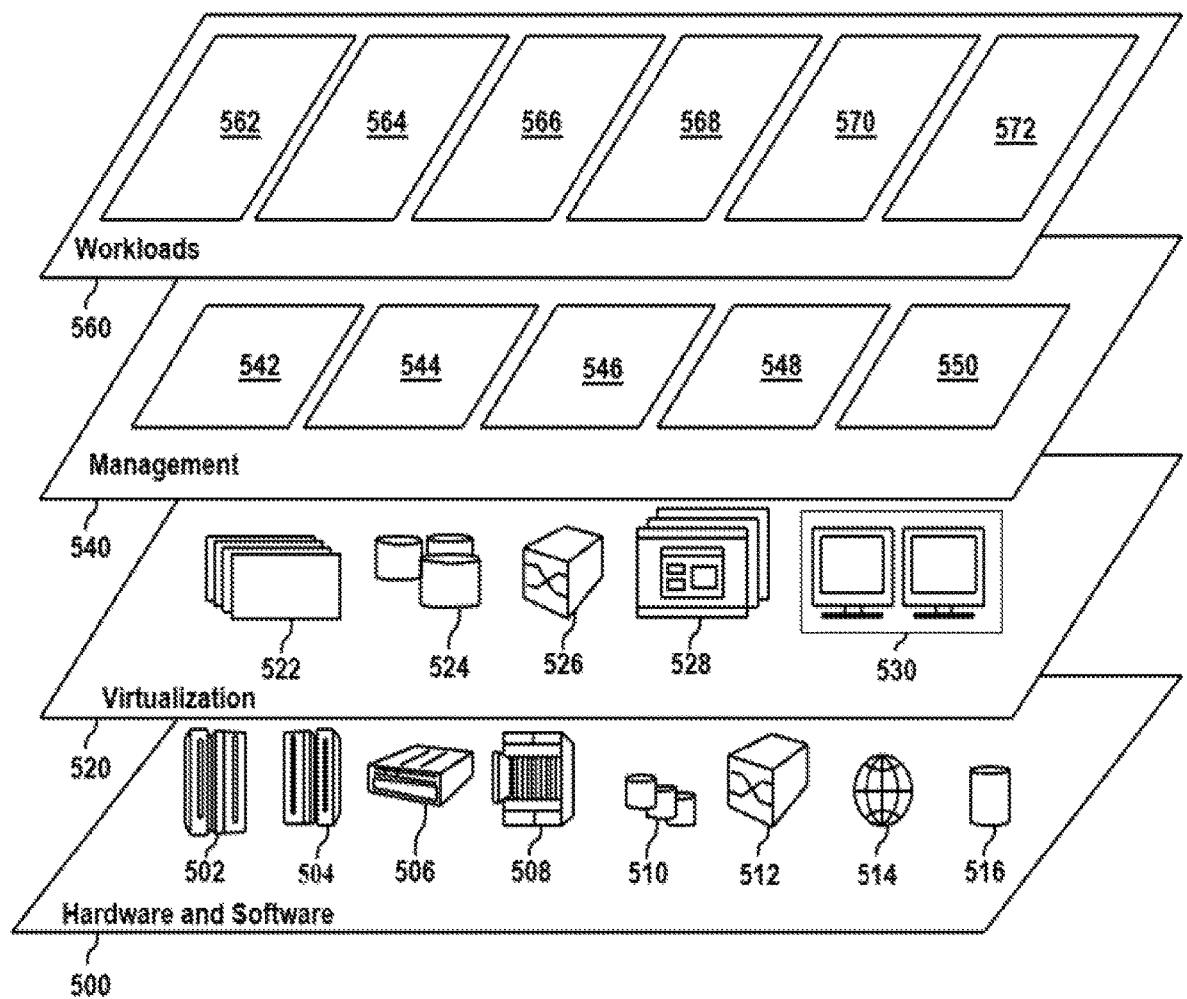
FIG. 5 is a block diagram illustrating abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture-based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. For example, security may include protecting (e.g., via a cryptographic hash function) user data which is used to determine whether a retention enhancement action should be issued. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and retention enhancement 572.

Figure 6:
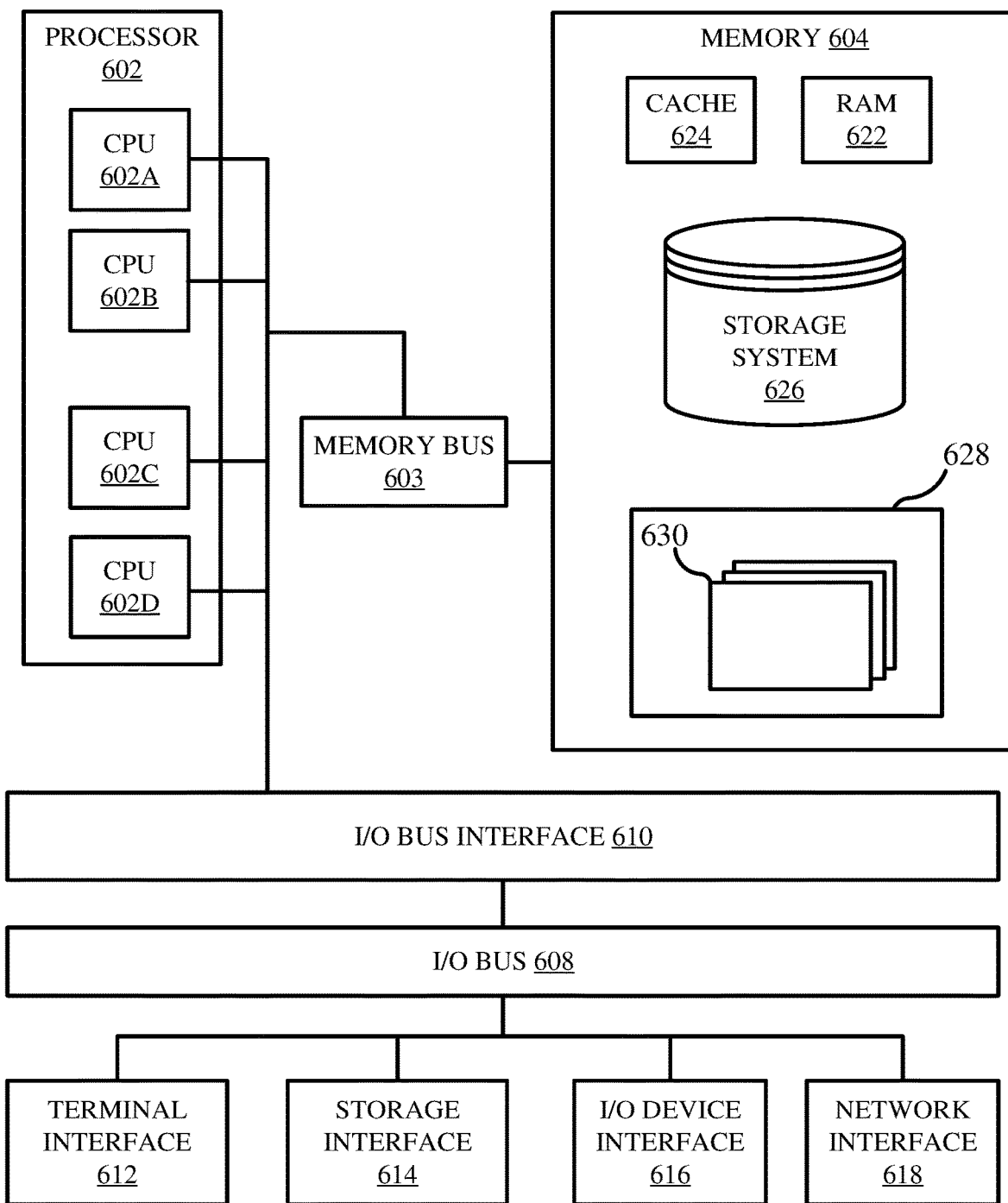
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105, server 135, device 205, retention enhancement system 201) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 may include a retention enhancement module. The retention enhancement module can be configured to obtain user data for a user currently reading electronic text on a device, analyze the user data to determine whether a retention action should be issued, and execute a retention action in response to a determination that the retention action should be issued.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding of the various embodiments. But the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
   a memory storing program instructions; and
   a processor, wherein the processor is configured to execute the program instructions to perform a method comprising:
   receiving a set of user data associated with a user currently reading electronic text on a device, the set of user data indicative of a reading retention of the user, wherein the set of data includes reading speed data based on a number of words read by the user over time, input interaction data based on user inputs from at least one input device coupled to the device indicative of the user's interaction with the electronic text, and navigation data indicative of the user's navigation patterns through the electronic text on the device;
   analyzing the set of user data to determine that the user currently reading electronic text on the device has a degraded retention level based on a plurality of criteria, each criteria having a weight, wherein the plurality of criteria include a reading speed criterion based on the reading speed data, an input interaction criterion based on the input interaction data, and a navigation data criterion based on the navigation data, wherein determining that the user has the degraded retention level indicates that a retention action should be issued; and
   executing, in response to determining that the user has the degraded retention level and thus the retention action should be issued, the retention action at the device the user is currently reading electronic text on to improve a retention level of the user beyond the degraded retention level in real-time.

2. The system of claim 1, wherein the method performed by the processor further comprises:
   storing, for the user, a set of historical data indicating previous retention actions issued;
   determining, using the set of historical data, a previous retention action which was effective for the user; and
   selecting, in response to determining the previous retention action which was effective, the previous retention action for the user in response to a determination that a second retention action should be issued for the user.

3. The system of claim 1, wherein the retention action includes scrambling letters of words within the electronic text.

4. The system of claim 1, wherein the set of user data includes eye-tracking data, wherein the number of words read by the user over time is determined based on the eye-tracking data, wherein determining that the retention action should be issued is completed based on the reading speed of the user falling below a predetermined reading speed threshold.

5. The system of claim 1, wherein the retention action includes closing an application running on the device.

6. The system of claim 1, wherein the method performed by the processor further comprises:
   determining whether the retention action should be reverted based on collecting a second set of user data; and
   reverting the retention action.

7. A computer program product comprising a computer-readable storage medium having program instructions embodied therewith, the program instructions executable by a processor to cause the processor to perform a method comprising:

receiving a set of user data associated with a user currently reading electronic text on a device, the set of user data indicative of a reading retention of the user, wherein the set of data includes reading speed data based on a number of words read by the user over time, input interaction data based on user inputs from at least one input device coupled to the device indicative of the user's interaction with the electronic text, and navigation data indicative of the user's navigation patterns through the electronic text on the device;

analyzing the set of user data to determine that the user currently reading electronic text on the device has a degraded retention level based on a plurality of criteria, each criteria having a weight, wherein the plurality of criteria include a reading speed criterion based on the reading speed data, an input interaction criterion based on the input interaction data, and a navigation data criterion based on the navigation data, wherein determining that the user has the degraded retention level indicates that a retention action should be issued; and executing, in response to determining that the user has the degraded retention level and thus the retention action should be issued, the retention action at the device the user is currently reading electronic text on to improve a retention level of the user beyond the degraded retention level in real-time.

8. The computer program product of claim 7, wherein a determination is made that the retention action should be issued based on the retention level satisfying a retention level threshold.

9. The computer program product of claim 7, wherein the reading speed criterion has a first weight higher than a second weight of the input interaction criterion.

10. The computer program product of claim 7, wherein the program instructions are downloaded to the computer readable storage medium from a distributed data processing system.

* * * * *